UNITED STATES PATENT OFFICE.

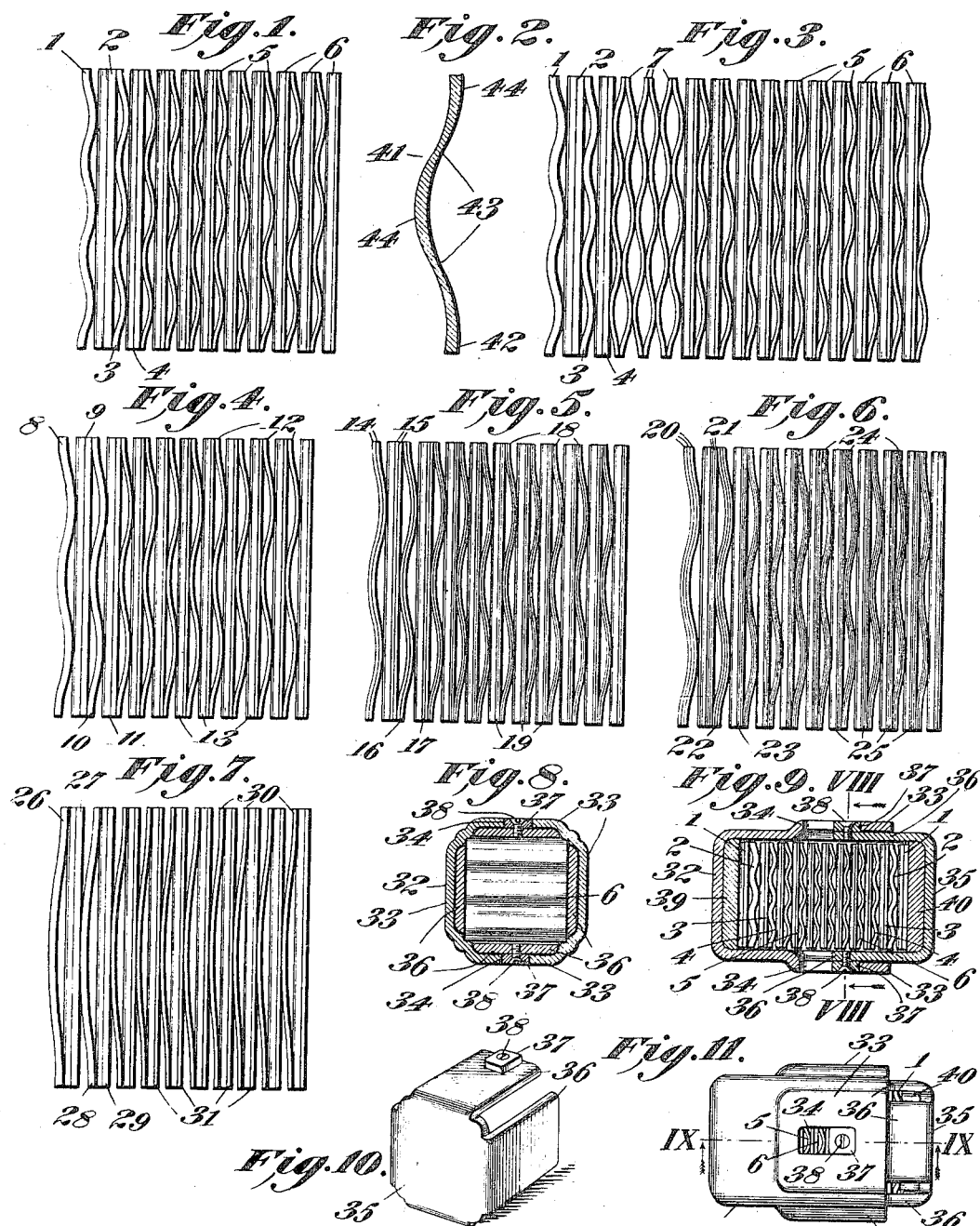

EDWIN E. SLICK, OF WESTMONT BOROUGH, PENNSYLVANIA.

SPRING.

1,139,732.

Specification of Letters Patent.

Patented May 18, 1915.

Application filed February 28, 1914. Serial No. 821,769.

*To all whom it may concern:*

Be it known that I, EDWIN E. SLICK, a citizen of the United States, residing in the borough of Westmont, in the county of Cambria and State of Pennsylvania, whose post-office address is Johnstown, Pennsylvania, have invented certain new and useful Improvements in Springs; and I do hereby declare the following to be a full, clear, and exact description of the invention, such as will enable others skilled in the art to which it appertains to make and use the same.

My invention relates to a special form of springs which are adapted for use in the draft rigging of railway cars, for the truck or bolster springs of cars of different kinds; for use on automobiles, wagons or vehicles of every description, and in fact my springs can be used in any place where springs are used requiring strength and resiliency.

My springs are formed of comparatively thin plates of steel which may be square or rectangular or of other outline, and each plate is provided with corrugations or waves, the axes of which are preferably parallel to each other, so that each corrugation acts as a spring when compressed. I use a number of these corrugated spring plates, the corrugations of which are disposed angularly with respect to the corrugations of the adjoining plates, in such a way that the projecting portions of the contacting plates are adapted to press against each other so that each plate forms an abutment against which its adjoining plate operates. I may make my corrugated spring plates single, or if it is desired to have greater spring action, I may make them laminated, that is, composed of two or more corrugated plates nested within each other, the corrugations of each compound plate being substantially parallel. By reason of this construction, my corrugated spring plates act in withstanding stresses, first by the elasticity and spring action of the corrugated portions, which, when subjected to pressure, tend to flatten out or become straight, and in addition to this the movement of one corrugated spring on the adjoining spring is attended with a considerable amount of frictional resistance, so that my group of corrugated springs acts both by the elasticity of the spring plates in bending, and by the friction of the contacting parts of the same when moving on each other. In addition to this it should be noted that the bending or flexure of each corrugated portion of my spring has the tendency to produce an arch action, in that a thrust or compressive force is carried through the curved portion of each corrugation in such a way as to counteract to a certain extent the tensile forces of that side of the spring plate which is subject to tensile stresses. This arch action therefore tends to lessen the tensile stresses which are due to bending and makes each plate more serviceable and capable of withstanding the stresses and performing its functions as described.

I prefer to make my plates of hard or spring steel which is rolled or pressed to form, either before or after being cut to lengths, and these plates are preferably hardened by heating them to the proper temperature dependent upon their composition, then quenching in oil or other cooling medium and afterward the temper is drawn to the required degree by heating them to a temperature less than that before quenching. I may also give my spring plates special treatment by double heating, double quenching, and drawing the temper, which, with some kinds of steel, will produce a more amorphous structure and one that is very well adapted to serve the purposes intended. I may also make the depths of the corrugations in my spring plates such that when each plate is flattened or nearly flattened by the pressure to which it is subjected, the stresses in the same will just about equal the proper working stress for this class of material, and this mode of construction will insure that the plates remain intact and capable of the best and longest service.

This application is a continuation in part of my application filed October 30th, 1913, Serial No. 798,178.

Having thus given a general description of my invention, I will now, in order to make the matter more clear, refer to the accompanying one sheet of drawings which forms part of this specification and in which like characters refer to like parts.

Figure 1 is a side or plan view of my corrugated springs as assembled for use in one form, each spring being formed of a plate of substantially uniform thickness. Fig. 2 is a cross section, on an enlarged scale, of a modified form of one of my springs showing it of varying thicknesses proportionate to the stresses and deflections to which it will be subjected in use. Fig. 3 is a top plan or side view of a group of my springs assembled in a slightly different manner from the illustration in Fig. 1. Fig. 4 is a view somewhat similar to Fig. 1, but showing the springs with fewer corrugations of greater radii of curvature. Fig. 5 is a plan or side view of a group of my corrugated springs similar to Fig. 4, but each spring is formed two-ply or laminated. Fig. 6 is a view similar to Fig. 5, with the exception that in this view, the laminated springs are three-ply. Fig. 7 is a side or plan view showing another arrangement of my springs, each of which has about one, or a little more than one corrugation. Fig. 8 is a cross sectional elevation of a group of my springs, on a reduced scale, showing a casing surrounding them, this view being taken on the line VIII—VIII of Fig. 9. Fig. 9 is a longitudinal cross sectional elevation of a group of my corrugated springs showing the casing surrounding them in cross section and the springs in side elevation, this view being taken on the line IX—IX of Fig. 11. Fig. 10 is a perspective view of the movable portion of the spring casing. Fig. 11 is a side or top plan view of a casing containing a group of my springs.

Referring now to the characters of reference on the drawings, the thicker end spring is indicated as 1, immediately adjacent to which is another one of equal thickness indicated as 2. The axes of direction of the corrugations of these separate pieces 1 and 2 are angularly disposed with respect to each other, and in this particular view this angle is substantially a right angle. It will thus be seen that the projecting portion of one corrugation rests against the corresponding projection of the corrugation on the opposite spring, so that these form lines or slight surfaces of contact. In compressing these springs, the one numbered 1 will expand in one direction, while that numbered 2 will expand and also frictionally slide upon the one marked 1 in a direction at right angles to the first named movement. The spring marked 3 is similar to the one marked 1, but shown of slightly less thickness, the corrugations being parallel to those of number 1, and similarly, the one marked 4 is of slightly less thickness than the spring numbered 2, while its corrugations are substantially parallel thereto. Other springs forming the group are numbered 5 and 6.

As shown in Fig. 3, certain of the springs are assembled differently from the others, these being marked 7, in which a few of the adjoining springs have the axes of their corrugations parallel.

As shown in Fig. 4, the springs have only two corrugations each, the end springs 8 and 9 being shown of greater thickness than the next pair 10 and 11, while the springs 12 and 13 are shown still thinner. As shown in Fig. 5, the end springs 14 and 15 are two-ply and of slightly greater thickness than the next pair 16 and 17, while the springs 18 and 19 are of still less thickness. As shown in Fig. 6, the end springs 20 and 21 are three-ply, the next sets 22 and 23 are also three-ply and of lesser thickness, while the other springs forming part of the same group, namely, 24 and 25 are still thinner. As shown in Fig. 7, the springs each have about only one corrugation, or a little more; the end springs 26 and 27 are of the greatest thickness, the next pair 28 and 29 are of slightly less thickness, while the other springs 30 and 31 are thinner. I do not, however, limit myself to the arrangement of thick and thin springs, but any group may be formed of springs of the same thickness as shown at the right hand portions of any of the Figs. 1 to 7 inclusive. In certain cases, however, I prefer to make some of the end springs thicker and the other ones thinner, so that the springs will have a cumulative action, that is, the thin ones will be compressed first, the next thicker ones next, and finally, the thickest will come into action, thus producing a graduated and increasing effect.

The outer main spring casing is indicated as 32, the side embossed portions of the same are indicated as 33, these being provided with the slots or openings 34 as shown. The inner spring casing in general is indicated as 35, this being adapted to slide within the outer casing 32. The inner spring casing 35 is provided with four separate projections 36, each adapted to fit and slide within a corresponding groove formed by the embossment of the outer casing as shown. Two or more of these projections 36 may be provided with a stop-block 37 secured thereto by the flush screw 38, or otherwise. Wear and strengthening plates 39 and 40 are provided on the bottoms of the insides of the casings as shown.

Referring now to Fig. 2, this is a cross section of a portion of a particular form of my corrugated spring indicated generally as 41, the central portion 44 of each corrugation being formed of comparatively thick material which is joined to the next corrugation by the thinner portion 43 as shown, the end portion of this spring being indicated as 42, of about the same thickness as portion 44.

I may make all these springs of the same thickness or I may make the end springs the thickest, the springs adjoining the end slightly thinner, and the central springs still thinner, in which case the thinner springs will first take up the pull or push with less resistance, and as the pull or push continues, this will then be taken up by the next set of slightly thicker springs and finally the thickest will come into action, thus providing a cumulative effect.

It will be noted that the corrugations of the springs are arranged alternately in different directions, so that the projecting portions of the corrugations, where these touch each other, are adapted to ride on each other on approximately straight lines. This arrangement of springs with the axes of the corrugations of one spring disposed in one direction and the axes of the adjacent spring at an angle to said direction is a particular and important feature of my invention, as this provides a spring resistance and also a frictional resistance during the compression and release of said springs by the sliding of the surface of one spring on the adjacent spring, and there is also a further arching effect in each corrugation whereby the tensile stresses, which would otherwise be so great as to tend to break the spring, are counteracted by the compressive force due to the arch action, thus enabling the springs to withstand more work per unit of volume or weight than simple springs of ordinary construction.

I have referred to the form of the surface of my spring plates as corrugated, but wish it understood that these plates may be made waved on their surfaces with waves of regular or, if preferred, of somewhat irregular outline and conformation. These waved plates will produce substantially the same results as the corrugated plates, but in cases where the waves are irregular they will come into action in series, one wave bending first and the wave of less depth bending thereafter so as to make a somewhat cumulative action. The waves may be regular in depth and irregular as respects their width or their disposition, in which case they will all act together when the plates are subject to compressive or expansive forces.

Referring now to Figs. 8 to 11, it will be seen that the springs are contained within the casing, the inner surface of said casing being adapted to contact with the edges of the spring plates and hold them in proper relative positions adapted to resist compression, and reaction when the force or weight is removed therefrom. It will be seen that those springs near the ends of the casing are adapted to contact by the whole of their side edges, whereas those between the end of the inner casing and that portion of the outer casing which has the same diameter, are adapted to contact by those portions of their edges near their corners with the outer casing, as clearly shown in Fig. 8. By means of this construction the springs are held in proper relation and at the same time permitted to be compressed and to expand. In order to assemble the spring as shown in Figs. 8, 9 and 11, the shorter plates are placed on the bottom of the casing, the spring is then placed in position as shown, the inner casing with the stop block removed is inserted in position and the stop blocks are then secured in place by means of the screws 38. When the springs are compressed the stop block moves within the slot 34, and when it has reached the limit of its expansive movement, it is stopped by the contact of the stop block with the end of the slot 34.

As the stresses in a corrugated spring, when subjected to flexure, are greater at the center or apices of the corrugations, I provide for this, as indicated in Fig. 2, by making the material thicker at these points as shown, and as these stresses diminish gradually toward the points of support, I consequently diminish the thickness of the material in these directions. As, however, this action is somewhat similar for each corrugation, the thinnest part of my spring is not at the end contact, or bearing portions thereof, but is intermediate between the apices of the corrugations as shown. By means of this construction, I provide a spring which is particularly well adapted to its work, is economical of material, and adapted to produce the results desired with the use of a minimum amount of material.

Although in certain cases I have shown my groups of springs in various thicknesses, as heretofore explained, I may make these all of the same thickness as shown in certain portions of the illustrations herein, and I wish it understood that my springs are adapted for use on wheeled vehicles, wagons, trucks of railway cars, automobiles, and otherwise.

One of the particular features of my invention resides in the construction and arrangement of groups of corrugated springs with the axes of the corrugations of adjacent springs angularly disposed, such groups being preferably retained in an inclosure adapted to guide the edges of said springs and hold them in proper relation to each other.

Although I have shown and described my invention in considerable detail, I do not wish to be limited to the exact and specific details shown and described, but may use such substitutions, modifications or equivalents thereof, as are embraced within the scope of my invention, or as pointed out in the claims.

Having thus described my invention, what I claim and desire to secure by Letters Patent is:—

1. A spring comprising a plurality of corrugated spring plates, the corrugations of adjacent plates being angularly disposed with respect to each other.

2. A spring comprising a group of plates each provided with a plurality of corrugations, the direction of the corrugations of one plate crossing that of the corrugations of the adjoining plate.

3. A spring comprising a group of adjoining plates each provided with a plurality of parallel corrugations, the direction of the corrugations of one plate crossing that of the adjacent plate.

4. A spring comprising a group of opposed plates each provided with a plurality of substantially parallel corrugations, the direction of the corrugations in adjacent plates being angularly disposed with respect to each other, and means for holding and guiding the said plates by the edges thereof.

5. A spring comprising a group of plates of different thicknesses, each provided with a plurality of corrugations, the direction of the corrugations of one plate crossing that of the direction of the corrugations of the adjoining plate, whereby cumulative and friction spring action is provided.

6. A spring comprising a group of plates, each composed of a plurality of plates provided with a plurality of parallel corrugations, one nested in the other, the direction of the corrugations of each of said compound plates thus formed crossing the direction of the corrugations of the adjoining plate.

7. A spring comprising a group of opposed plates each provided with a plurality of parallel corrugations, the thickness of said plates being greater at the apices of the corrugations and tapering thence in both directions between said apices.

8. A compound spring comprising a plurality of opposed spring plates each provided with a plurality of corrugations, the direction of the corrugations of adjacent plates being arranged crosswise with respect to each other.

9. A compound spring comprising a plurality of opposed spring plates each provided with a plurality of parallel corrugations, the direction of the corrugations of adjacent plates being arranged crosswise with respect to each other.

10. A compound spring comprising a plurality of opposed spring plates each provided with a plurality of corrugations, the direction of the corrugations of adjacent plates being arranged crosswise with respect to each other, and means adapted to contact with the edges of the plates and maintain them in operative positions.

11. A compound spring comprising a plurality of corrugated spring plates, the direction of the corrugations of each plate crossing that of the corrugations of the adjoining plate, a casing surrounding the edges of said plates adapted to contact with portions of said edges to guide said plates and maintain them in operative positions.

12. A spring comprising a plurality of waved plates, the direction of the waves of adjacent plates being angularly disposed with respect to each other.

In testimony whereof I hereto affix my signature in the presence of two witnesses.

EDWIN E. SLICK.

Witnesses:
A. DIX TITTLE,
PLUMA F. LONGSHORE.